B. URSO.
ELECTRIC EGG BOILER.
APPLICATION FILED FEB. 23, 1918.
1,335,306.
Patented Mar. 30, 1920.
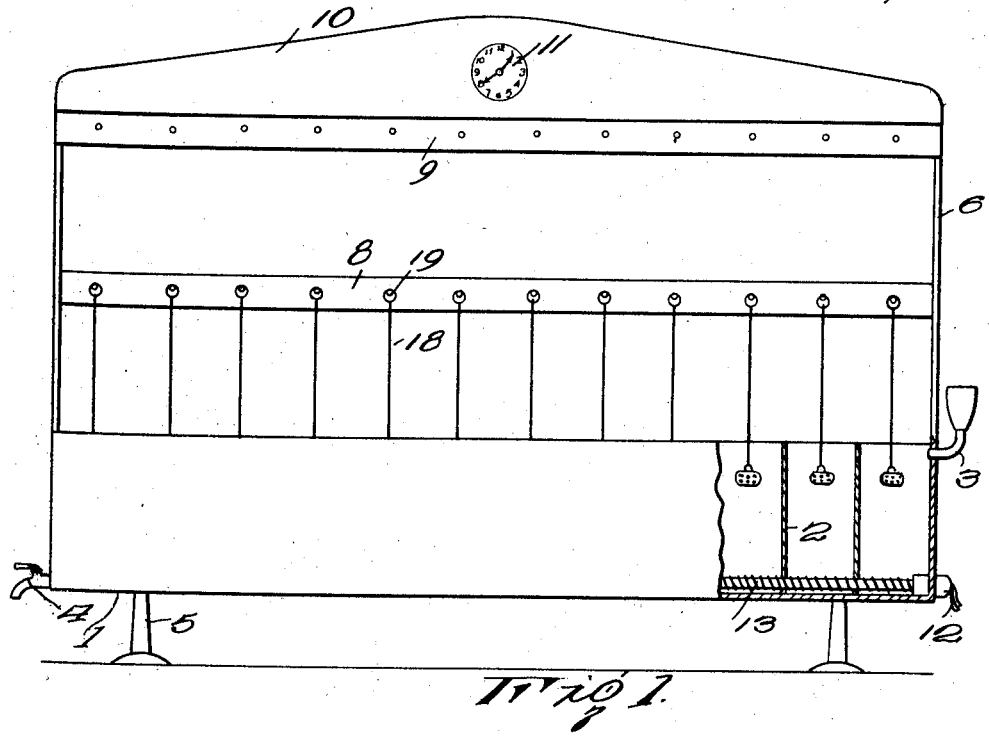
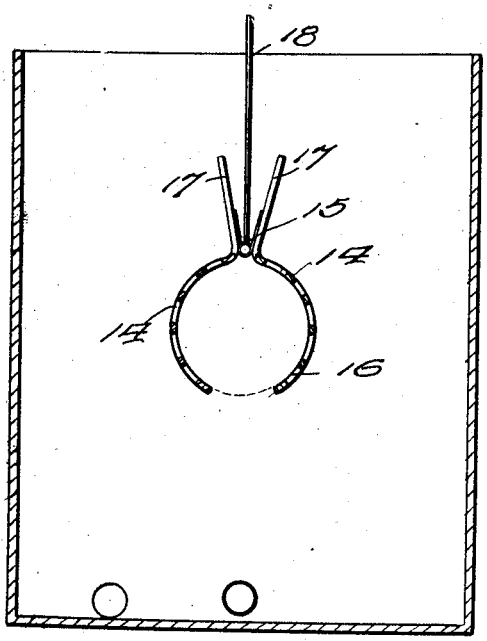

UNITED STATES PATENT OFFICE.

BENEDETTO URSO, OF FAIRMONT, WEST VIRGINIA.

ELECTRIC EGG-BOILER.

1,335,306. Specification of Letters Patent. Patented Mar. 30, 1920.

Application filed February 23, 1918. Serial No. 218,736.

*To all whom it may concern:*

Be it known that I, BENEDETTO URSO, a subject of the King of Italy, residing at Fairmont, in the county of Marion and State of West Virginia, have invented certain new and useful Improvements in Electric Egg-Boilers, of which the following is a specification.

This invention relates to new and useful improvements in cooking devices, and the primary object of the invention is to provide an egg cooking device, for boiling eggs, which comprises a water holding and heating means with egg suspending devices, adapted to hold the eggs in the water, the desired length of time to insure their boiling to the desired degree.

Another object of the device is to provide an egg boiling means of this character, which comprises a receptacle divided into a plurality of water holding compartments, and means for heating the water therein, said receptacle having racks above the compartments and egg holding means suspended from said racks whereby the eggs are adapted to be supported in the water, or above the same as is desired.

An additional object of this invention is to provide an egg supporting device of this character especially adapted for use in lunch rooms, and which comprises a plurality of receptacles or compartments which contain heated water, and egg holding means adapted to be positioned in each receptacle and suspended therein the desired length of time to cook the egg. The device is furthermore provided with a signal which will inform the operator when the egg has been cooked the required length of time.

A still further object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claims.

In the accompanying drawings:

Figure 1 is a front elevation of the device partly in section, and

Fig. 2 is a transverse vertical section through the same.

In describing my invention, I shall refer to the drawings in which similar reference characters designate corresponding parts throughout the several views.

The numeral 1 designates the receptacle, which is divided into a plurality of compartments by partition members 2, said compartments adapted to contain water which is fed thereto through the water inlet 3 disposed at one end of the receptacle 1. The receptacles are also preferably connected by openings 2$^a$ through the partitions, and the device is provided with an outlet faucet 4 at the opposite end of the receptacle 1. The receptacle 1 is mounted on supporting legs 5 and may be of any desired size according to the use desired.

Supported above the receptacle 1 and its compartments, by standards 6 at opposite ends thereof, are a pair of upper and lower racks 9 and 8, which are provided with a plurality of hooks thereon for a purpose to be hereinafter more fully described. The upper rack 9 supports thereon a frame 10, having mounted therein the signal 11, which comprises an alarm clock which is adapted to be set so that when a predetermined length of time has elapsed, a bell will ring to signal the operator that the eggs have cooked the desired time.

The water in the receptacle 1 or compartment, is heated by electricity, the device being provided with a plug 12 at one end thereof, which receives a conducting wire that heats the rheostat 13 employed to heat the water. The device is provided with a central heating member disposed longitudinally within the receptacle 1 so as to heat the water in all of the compartments simultaneously.

The egg supporting means employed comprises an egg holder adapted to be positioned in each of the receptacles, and as the same means are employed for each, I will only specifically describe one of the same. The egg holding means comprises a pair of clamping jaws 14, which are hingedly connected as shown at 15, a spring being positioned thereon so that the jaws are normally engaged with each other. The jaws are perforated as shown at 16, so as to allow the water to enter between the same and contact with the egg contained therein. These jaws are adapted to be opened by a pair of ears 17 that project from the upper edges thereof, and which when engaged and pressed toward each other will open the opposite faces of the jaws so as to permit the removal or insertion of an egg, or eggs therein according to the size of the jaws. These jaws when closed form egg holding compartments and they are adapted to be supported, by chains or rods 18 having loops 19 on their upper ends adapted to be hung on the hooks of each of the racks 8 or 9. These racks 8 and 9 are the upper and lower racks, and it is obvious, that when the devices are suspended from the lower rack 8 the egg holding jaws will be positioned within the water in the compartment directly beneath the same, while if they are suspended from the rack 9, the egg holding means will be positioned above the device, and will consequently be inoperative.

This type of egg boiling device is especially adapted for use in lunch rooms and hotels, where patrons desire eggs boiled for different lengths of time, and this device provides a means for expediting the cooking thereof. The water in the compartments may be kept heated, and the egg holding devices when not in use are suspended from the upper rack, and when it is desired to use one of the same, the jaws are forced open and the egg or eggs are inserted therein, and the device is then removed from the upper rack, and positioned on the lower rack, whereupon the egg holding jaws will be suspended within the boiling water, and the eggs are consequently cooked. When the egg holding jaws are positioned in the water, the clock is set, so that when a predetermined time has elapsed, a bell will ring, so as to notify the operator that the cooking operation has been completed. The removal of the eggs from the water is very simple, and upon grasping the ears 17 the jaws will be forced apart, and the eggs may be easily removed therefrom.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim is new, and desire to secure by Letters Patent, is:

1. An egg boiler including a receptacle for holding water, partitions having openings formed therein dividing the receptacle into a plurality of inter-communicating compartments, superposed racks on the receptacle, means for heating the water in the receptacle, and means carried by the racks for positively gripping eggs and suspending the same above or within the several compartments whereby the same may be either disposed above or cooked within the compartments.

2. An egg boiler including a receptacle for holding water, having an inlet and an outlet in the ends thereof, partitions having openings formed therein dividing the receptacle into a plurality of inter-communicating compartments for permitting circulation of water therebetween, racks on the receptacle disposed one above the other, means for heating the water in the receptacle, and means carried by the racks for positively gripping or releasing eggs and suspending the same from one or the other of the racks whereby the same may be either disposed above or cooked within the compartments.

In testimony whereof I affix my signature hereto.

BENEDETTO URSO.